PATTERN RECOGNITION SYSTEM UTILIZING RANDOM MASKS

Filed May 1, 1961 5 Sheets-Sheet 1

| ASSOCIATION UNIT | 32A | | 32B | | 32X | |
|---|---|---|---|---|---|---|
| COUNTER | 68A+ | 68A- | 68B+ | 68B- | 68X+ | 68X- |
| 50 A SAMPLES | 38 | 12 | 7 | 43 | 32 | 18 |
| 50 B SAMPLES | 14 | 36 | 19 | 31 | 15 | 35 |
| 50 C SAMPLES | 7 | 43 | 41 | 9 | 20 | 30 |
| 50 D SAMPLES | 25 | 25 | 32 | 18 | 44 | 6 |

INVENTOR.
AUGUSTO GAMBA

BY

Robert D. Sanborn
ATTORNEY

June 7, 1966 A. GAMBA 3,255,436

PATTERN RECOGNITION SYSTEM UTILIZING RANDOM MASKS

Filed May 1, 1961 5 Sheets-Sheet 2

INVENTOR.
AUGUSTO GAMBA
BY
Robert D. Sanborn
ATTORNEY

PATTERN RECOGNITION SYSTEM UTILIZING RANDOM MASKS

Filed May 1, 1961 5 Sheets-Sheet 3

INVENTOR.
AUGUSTO GAMBA
BY
Robert D. Sanborn
ATTORNEY

PATTERN RECOGNITION SYSTEM UTILIZING RANDOM MASKS

Filed May 1, 1961 5 Sheets-Sheet 4

INVENTOR.
AUGUSTO GAMBA
BY
Robert D. Sanborn
ATTORNEY

INVENTOR.
AUGUSTO GAMBA
BY
Robert D. Sanborn
ATTORNEY

United States Patent Office 3,255,436

Patented June 7, 1966

3,255,436

PATTERN RECOGNITION SYSTEM UTILIZING RANDOM MASKS

Augusto Gamba, Genoa, Italy, assignor, by mesne assignments, to Philco Corporation, Philadelphia, Pa., a corporation of Delaware Filed May 1, 1961, Ser. No. 106,670
16 Claims. (Cl. 340—146.3)

The present invention relates to pattern recognition devices and more particularly to pattern recognition devices of the type which compare a response to unknown patterns with responses derived from a plurality of patterns of a known type.

Pattern recognition machines have been proposed in which certain geometric or topologic features of a desired pattern are defined by templates. Appropriate means are provided for comparing an unknown pattern with the template to determine the degree of correlation between the unknown pattern and the template. These systems have the disadvantage that the key features of the desired pattern must be selected in advance and proper templates constructed to define these features. In addition, suitable means must be provided for correlating the unknown pattern with the template. This usually involves the use of a computer or other complex circuitry.

Another form of pattern recognition device has been proposed in which a plurality of photocells or other equivalent sensors each examine discrete areas of the pattern to be recognized. Selected photocells are connected together in groups to form a composite area signal. These composite area signals are then combined in accordance with selected statistical principles to provide an overall response to the displayed patterns. Systems of this type are readied for operation, i.e. taught the desired pattern, by scanning a plurality of patterns of known classes. A feedback network is provided which modifies the statistical combining circuits in a selected manner in response to the output signals indicative of patterns of known classes. Systems of this type are subject to the disadvantage that the interconnection of the numerous photocells is complex. Further, a change in the type of pattern to be recognized may require rewiring of the connections to the photocells. While this can be tolerated in certain laboratory equipment, it cannot be tolerated in commercial pattern recognition systems. The second type of prior art pattern recognition system described above is subject to the further disadvantage that the feedback connections which are required to enhance the response to the patterns of a desired class further add to the complexity of the overall system.

It is an object of the present invention to provide a pattern recognition system which will recognize patterns of a selected class without the use of template masks or complex interconnections of sensing elements.

It is a further object of the present invention to provide a pattern recognition system in which the comparison criteria may be changed without changing the interconnection of the various elements of the system.

An additional object of the invention is to provide a pattern recognition system which permits relative simplicity in the data processing circuitry.

Still another object of the present invention is to provide a pattern recognition system which requires only a single photoresponsive device and simply generated optical masks.

SUMMARY

In general these objects and other objects which will appear as the description of the invention proceeds are achieved by providing a plurality of association units, each of said association units comprising a single photoresponsive device and a mask. Each of the masks is so positioned with respect to the patterns to be recognized and the photoresponsive device that the presence of the mask modifies the total amount of energy received by the photoresponsive device from the pattern in accordance with the characteristic of that mask. Each of said association units further comprises a threshold circuit coupled to the output of the photoresponsive device. The threshold circuit is adapted to provide one output signal in response to the incidence on said photoresponsive device of more than a preselected amount of energy and a different output signal in response to the incidence of less than said related amount of energy. Means are provided for weighting the response of each threshold unit in accordance with a statistically determined relationship between the mask of that association unit and a selected class of patterns to be recognized. Additional data processing means are provided for combining the weighted output signals to obtain a signal representative of the product of the weighted responses of a selected number of the association units. The association units may be entirely independent of one another or all association units may share a common photoresponsive device.

For a better understanding of the present invention together with other and further objects thereof reference should now be made to the following detailed description which is to be read in conjunction with the accompanying drawings in which:

FIG. 1

Figures 1, 5, 6:
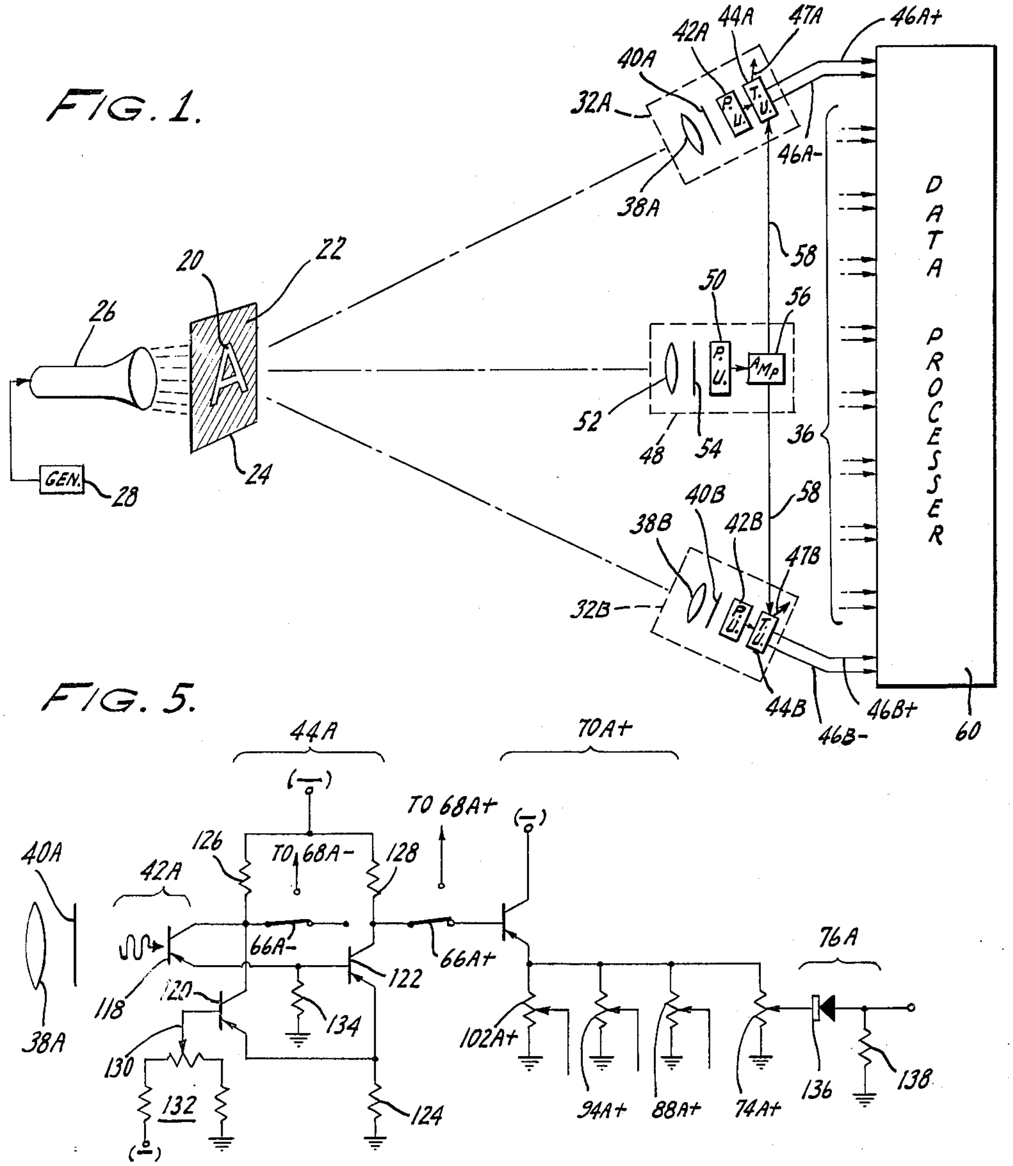
FIG. 1 is a pictorial view, partially in block form of one preferred embodiment of the invention.
FIG. 5 is a schematic wiring diagram of a representative portion of the block diagrams of FIGS. 2 and 3.
FIG. 6 is a table of values illustrative of the operation of the system of FIGS. 1–5.

In the embodiment of the invention illustrated in FIG. 1, the pattern to be recognized comprises a combination of transparent or translucent areas 20 and opaque areas 22 on an object 24. By way of illustration it is assumed that the transparent area 20 is the form of a block letter A. However it is to be understood that the areas 20 and 22 may take a wide variety of forms which may include, for example, photographic representation of selected ground areas, letters, numerals and combinations of letters, numerals and arbitrary symbols. A light source 26 is provided for illuminating object 24 from the rear. As shown in FIG. 1 the light source 26 is energized from an energy source 28.

A plurality of property sensing or association units 32A and 32B are so arranged that each views the entire object 24. For convenience throughout the following description, all circuits of a given class or type will be identified by the same reference numeral. Individual circuits within a class will be distinguished by the addition of the letters A, B, C, etc. following the base numeral. Thus the two association units shown in FIG. 1 will be hereinafter referred to collectively as association units 32 and individually as association units 32A and 32B, respectively. Only two association units are shown in order to simplify the drawing. However it is to be understood that, in general, more than two association units will be required for proper pattern recognition, the minimum necessary being in the range from less than ten for simple patterns to as many as several hundred or several thousand for more complex patterns. The additional association units corresponding to units 32A and 32B are represented diagrammatically in FIG. 1 by the paired input leads 36.

Figures 3, 4:
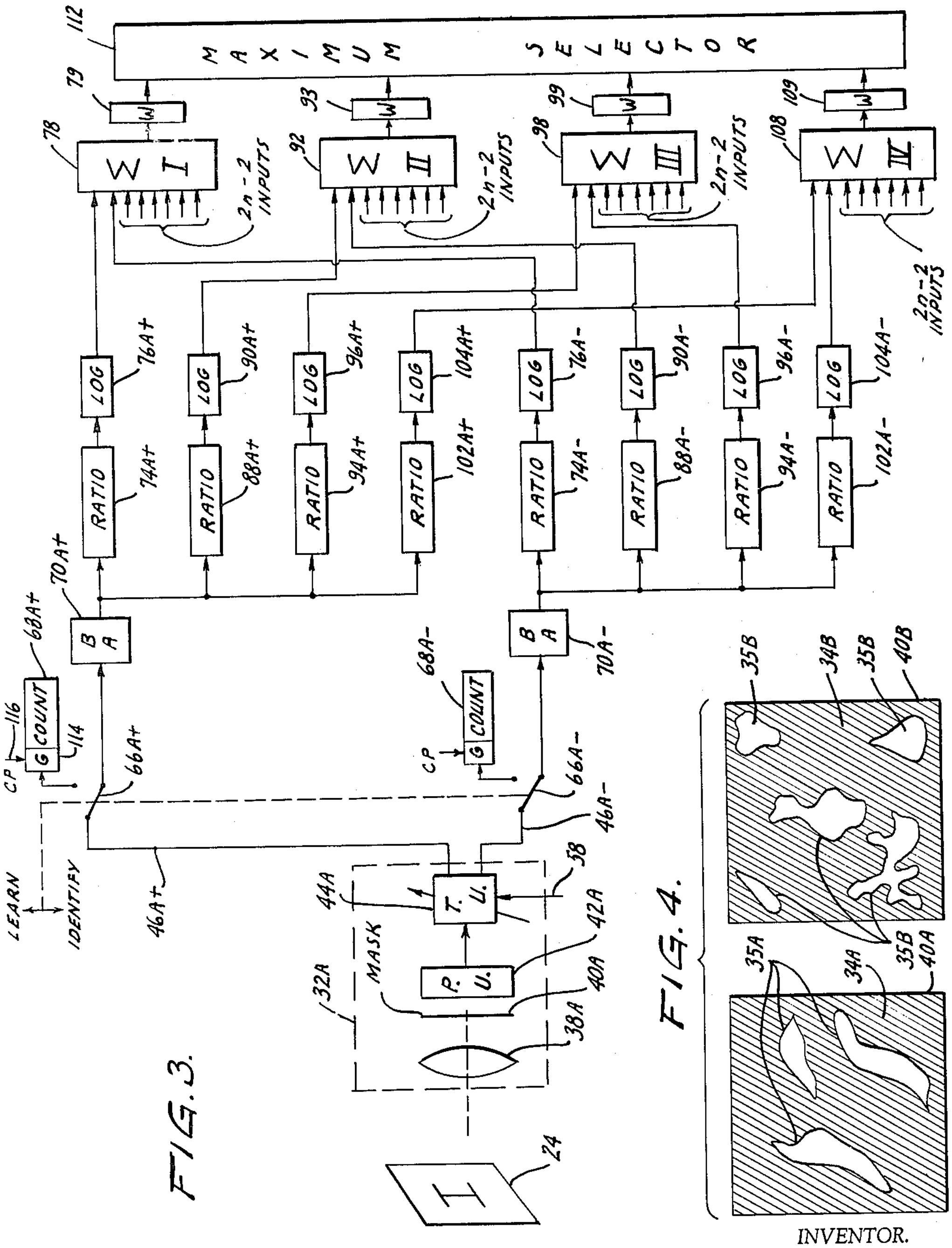
FIG. 3 is a detailed, partial block diagram of the embodiment of FIG. 1 showing the circuits associated with one of the association units of the embodiment of FIG. 1.
FIG. 4 is a pictorial view of two typical masks which may be employed in the system of FIG. 1.

Each of the association units 32 measures a different property of the pattern present on object 24. The property that is measured is the relationship of the total amount of light from the examined pattern which passes through the mask of that association unit to a selected light threshold value. To accomplish this comparison each association unit 32 is provided with a mask 40 and a lens 38 for imaging the entire pattern or object 24 on mask 40. A photoresponsive unit 42 is located behind mask 40 in a position to be energized by the total light flux passing through mask 40. Photoresponsive unit 42 may take the form of a photovoltaic cell, a photodiode or a phototransistor. Mask 40 may have the form of a generally opaque sheet having randomly or pseudo randomly distributed transparent areas. Examples of masks of this type are shown in FIG. 4. The mask 40A in FIG. 4 has an opaque area 34A and three irregular transparent areas 35A. The mask 40B has an opaque area 34A and five transparent areas 35B. Ideally, the mask for each association unit 32 is materially different from the mask of any other association unit. The transparent areas 35A and 35B need not bear any fixed relationship to any of the patterns to be recognized. While a few relatively large transparent areas are shown in the masks 40A and 40B of FIG. 4, it is to be understood that many smaller transparent areas may be employed instead. For example, masks may be generated by drawing opaque lines at random on a transparent plate until a preselected degree of total opacity is obtained. As an alternative, mask 40 may be made up of a plurality of regularly arranged small sub-areas which are randomly or pseudo randomly transparent or opaque.

Photoresponsive unit 42 provides a single output proportional to the total light passing through the optically superimposed object 24 and mask 40.

Each of the association units 32 includes a threshold unit 44. Threshold unit 44 provides a signal on one output lead 46+ if the output of photoresponsive unit 42 exceeds a certain preselected threshold level and a signal on output lead 46− if the signal from photoresponsive unit 42 does not exceed the selected threshold level. The notation (+) will be employed to designate circuits active in response to a signal from one of the photoresponsive units 42 which exceeds the selected threshold level. The notation (−) designates circuits active in response to signals indicative of the fact that the signal from photoresponsive unit 42 does not exceed the selected threshold level. For reasons which will be explained presently the threshold level of each of the units 44 is manually adjustable. This is schematically represented in FIG. 1 by the arrows 47.

A threshold level control unit 48 is provided for compensating for changes in ambient light level falling on object 24. Circuit 48 is provided with a photoresponsive unit 50 which may be similar to photoresponsive unit 42 in the association units 32. A lens 52 is provided for imaging object 24 on photoresponsive unit 50. A suitable uniform density light attenuator 54 may be provided between lens 52 and photoresponsive unit 50 for reducing the light falling on photoresponsive unit 50 to a safe working level.

The output of photoresponsive unit 50 is supplied directly to a direct current amplifier 56. The outputs 58 of amplifiers 56 are connected to the threshold units 44 in each of the association units 32. It is to be understood that only one light intensity control 48 is required for the entire system.

The signals provided by the association units 32 are combined in accordance with certain statistical rules to provide signals which are representative of the degrees of relative probability that an unknown pattern belongs to each of the classes of patterns recognized by the system. The data processing circuits of the present invention are shown only as a single block 60 in FIG. 1. However these circuits are shown in more detail in FIGS. 2 and 3.

FIGURES 2 AND 3

Figure 2:
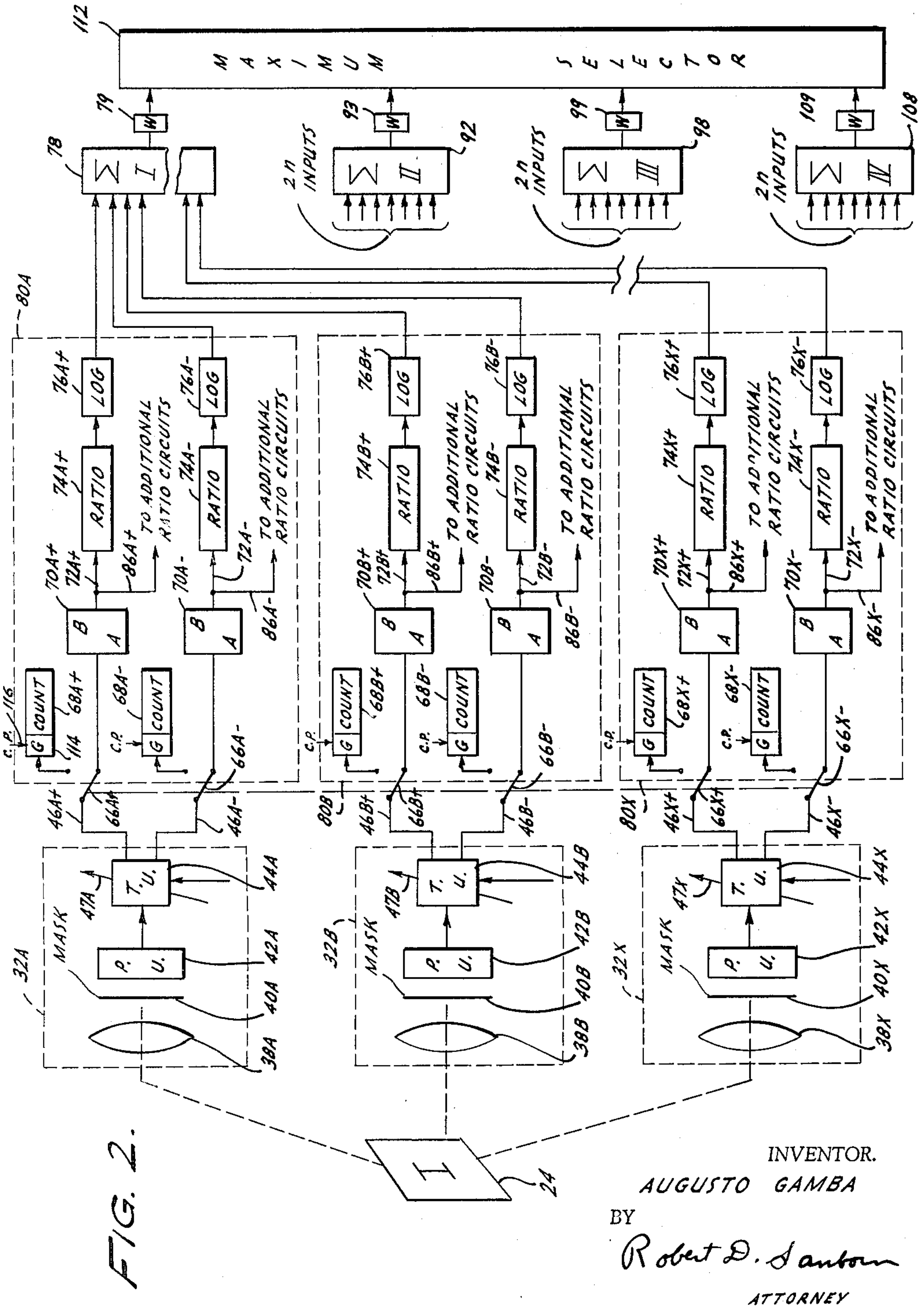
FIG. 2 is a detailed, partial block diagram of the embodiment of FIG. 1 showing the circuitry employed for determining the probability of occurrence of an observed pattern on the assumption that it belongs to a selected class of patterns.

In order to simplify the drawings, FIGS. 2 and 3 are both fragmentary or partial block diagrams of the system of FIG. 1. FIG. 2 shows three association units 32 and the circuits relating to one class of patterns. The circuits corresponding to the other classes of patterns are only partially shown. FIG. 3 shows only one association unit 32 and the circuitry for all classes of patterns for this association unit. It should be understood that FIGS. 2 and 3 are not views of different embodiments. Rather they are different fragmentary views of the same embodiment.

It will be seen that the units 32A and 32B of FIG. 2 and 32A of FIG. 3 correspond to similarly numbered elements in FIG. 1. The additional association unit shown in FIG. 2 is identified by the reference numeral 32X. The output leads 46A+ and 46A− are connected to the poles 66A+ and 66A− of a double pole, double throw switch. Switch (66A+)-(66A−) in its upper position connects leads 46A+ and 46A− to binary counters 68A+ and 68A−, respectively. In the position shown in FIG. 2, switch (66A+)-(66A−) connects output leads 46A+ and 46A− to the inputs of buffer amplifier circuits 70A+ and 70A−, respectively. Output lead 72A+ of amplifier 70A+ is connected by way of a signal ratio or weighting circuit 74A+ and a logarithmic response circuit 76A+ to one input of a signal adder circuit 78. In a similar fashion, output leads 72A− is connected by way of signal ratio or weighting circuit 74A− and logarithmic response circuit 76A− to a second input of signal adder circuit 78. Signal ratio circuits 74A+ and 74A− may be potentiometers. The circuit shown within the broken line 80A is repeated for each of the association units 32B, 32X, etc. The various units 80 will differ only in the setting of the ratio or weighting circuits 74. The two output connections of each of the units 80 are connected to the appropriate inputs of adder circuit 78.

The signal ratio circuits 74A+ and 74A− and the logarithmic circuits 76A+ and 76A− are duplicated for each of the characters to be viewed by association unit 32. These additional ratio devices are represented only schematically in FIG. 2 by the leads 86A+, 86A−, 86B+, etc. However the complete circuit associated with one association unit 32 for four characters or four patterns is shown in FIG. 3.

It will be seen that the signal ratio circuits 88A+ and 88A− and logarithmic response circuits 90A+ and 90A− which corresponds to radio device 74A+ and logarithmic device 76A+ are connected to a second adder 92 which corresponds to the signal adder 78 for the first character. Similarly the ratio circuits 94A+ and 94A− connect through logarithmic response circuits 96A+ and 96A−, respectively, to a third signal adder circuit 98. The fourth channel includes the signal ratio circuits 102, logarithmic response circuits 104 and signal adder circuit 108.

It will be seen that logarithmic response circuits 76 together with signal adder circuit 78 provide means for multiplying together the signals provided by ratio devices 74. Other forms of multiplier circuits may be substituted for those shown. However the circuits shown are at present believed to be most expedient for the large number of signals involved. Again it should be remembered that while only three association units 32 are shown in FIG. 3, in general there will be $n$ such units where $n$ is a number in the range from less than 10 to several hundred or several thousand. Each of the adder units 78, 92, 89 and 108 will have $2n$ inputs each since each association unit 32 has two outputs.

The outputs from the four signal adders 78, 92, 98 and 108 are connected to a maximum amplitude selector circuit 112 by way of ratio or weighting circuits 79, 93, 99 and 109. Again these ratio or weighting circuits may be potentiometers. Circuit 112 provides an indication of which of the four circuits 79, 93, 99 and 109 is providing the larger output. For example, maximum amplitude selector circuit 112 might comprise four meters, one connected to the outputs of each of the circuits 79, 93, 99 and 109. The meter providing the largest deflection would indicate the circuit providing the greatest output.

Counters 68 require no detailed description. They may be conventional binary pulse counters. These counters function only during the setup or learning function of the circuit to register whether or not the threshold of unit 44 is exceeded as each known pattern is viewed. Since binary counters are generally responsive to pulses and the circuit shown in FIGS. 2 and 3 provides a steady response, it may be necessary to provide a pulse to each of the counters 68 each time a new known pattern is viewed. This may be accomplished by forming the input stage of each counter 68 as a gate circuit 114 which receives a direct current actuating signal by way of switch 66 and a clocking pulse by way of input 116. One pulse is supplied to input 116 for each known pattern viewed. These pulses may be manually generated by means of a suitable push button or they may be generated automatically by appropriate circuitry each time a new pattern is in position to be viewed.

There are several ways known in the art for implementing the block diagram shown in FIGS. 2 and 3. Therefore the invention is not to be limited by any particular circuit shown. However as an aid to a more complete understanding of the present invention a typical circuit for one of the signal channels associated with a single association unit 32 has been shown in FIG. 5.

In FIG. 5 the lens 38A and mask 40A correspond to the similarly numbered elements of FIGS. 1–4. The photoresponsive unit 42A comprises a phototransistor 118. The threshold unit 44A comprises two transistors 120 and 122 which have a common emitter-resistor 124 and separate collector resistors 126 and 128. The base of transistor 120 is connected to the movable tap 130 of a potential divider 132. Tap 130 permits the manual adjustment of the threshold level mentioned above. Potential divider 132 is connected between ground and a source of negative potential represented schematically by the symbol (—) in FIG. 5. This source of negative potential may be a fixed source or it may be the output 58 of the light control 48 of FIG. 1. The base of transistor 122 is coupled to the collector of transistor 120 by way of the emitter-collector path of phototransistor 118. The base of transistor 122 is also returned to ground by way of resistor 134. It will be seen that transistor 120 is normally conducting in the absence of light on the phototransistor 118 while transistor 122 is normally off. When the light falling on phototransistor 118 exceeds a threshold level determined by the potential at tap 130, transistor 122 is turned on. By proper choice of circuit values the switching action can be made to occur within a very narrow range of light values thus giving a sharp threshold characteristic.

The two outputs from threshold unit 44A are taken from the collectors of the two transistors 120 and 122, respectively, by way of switch (66A+)-(66A—) which corresponds to the similarly numbered switch in FIGS. 2 and 3. The buffer amplifier 70A+ is a conventional emitter follower circuit which has as its emitter load a series of adjustable potentiometers. These potentiometers function as the signal ratio devices 74A+, 88A+, 94A+ and 102A+ of FIG. 3 and therefore bear the same reference numerals in FIG. 5.

The logarithmic response circuit 76A comprises a logarithmic diode 136 and load resistor 138. Usually logarithmic diodes have a limited range in which the response is truly logarithmic. Therefore the constants of buffer amplifier 70A+ and ratio device 74A+ should be selected to maintain the signal within this range for all possible adjustments of ratio device 74A+.

OPERATION—FIGURES 1 TO 5

The system of FIGS. 1–5 "recognizes" a pattern by ultimately determining the statistical probabilities that an unknown pattern belongs to each of the classes of patterns which will be recognized by the system. If the statistical probability for one class is greater than for all other classes the pattern is "recognized" as belonging to that class having the highest statistical probability.

LEARNING PHASE

Since the masks 40 need not have any fixed or known relationship to the pattern to be recognized, it is necessary to teach the system of FIGS. 1–5 the distinguishing characteristics of patterns of each class. This teaching or learning phase is accomplished as follows. A representative number of patterns which are individually different in any manner or combination of ways but all of the same class are examined by the system and a record is maintained for each association unit of the number of patterns which caused the threshold of that association unit to be exceeded and the number of patterns for which the threshold was not exceeded. For example, all samples of the first class might be in a block letter A. However the individual samples might vary in size, orientation, position within the field, slope of the strokes, etc. The variation in teaching samples should follow the variations likely to be encountered during the recognition phase. The number and extent of the variations which can be permitted from the abstract pattern of a class will depend to a great extent on the number of association units in the system, the sharpness of the threshold levels and the number of learning samples shown. In general, the more association units provided and the sharper the threshold levels, the greater the extent of variations which can be tolerated. Again it should be kept in mind that to be most effective the recognition characteristics of each of the association units should be different from that of all other association units. Uniform duplication of association units will not affect the validity of the recognition process but it will decrease the effective number of association units. That is, a system having 100 pairs of association units, each association unit of a pair having the same mask and the same threshold as the other unit of the pair will provide data of exactly the same reliability as a similar system in which one association unit of each pair is removed. Therefore the second system having only 100 association units provides the same data as the first system having 200 association units.

As will be seen presently, non-uniform duplication of the association unit, that is having exact duplication of some association units but not all of the association units, will affect the statistical reliability of the recognition system by giving greater weight to certain properties than to other properties. In some instances this may enhance the reliability of recognition of certain patterns and degrade the reliability of recognition of other patterns. Since the effect of non-uniform duplication of association units is generally difficult to predict and may have a degrading effect, it should be avoided wherever possible. Obviously duplication of one or a few association units in a system having only a small number of association units will have a greater effect on overall performance than the same number of duplications in a system having a large number of association units. However duplication of association units is easier to detect and correct in systems having only a few units than it is in systems having many units. In general, duplication of association units is most easily avoided by employing purely random masks. However in many instances two association units having identical masks may be caused to have different recognition properties by employing different threshold levels in the two units. When one association unit does not exactly duplicate another but when their responses to many excitations show a non-zero correlation, the above-mentioned effects of duplication are present to a reduced degree. However the system will function correctly even when such correlations are present provided the overall correlation properties are distributed more or less uniformly throughout the set of association units.

Returning now to the learning phase of the system, suppose counters 68 are cleared to zero and switches 66 are set in their uppermost position to connect counters 68 to the association units 32. Suppose further that 50 different samples of the block letter A are examined with the results tabulated in the first line of FIG. 6 of the drawing. Now assume that counters 68 are again cleared to zero and that a representative number of samples or patterns of the second class are examined. To follow the example begun above, suppose 50 block letter B's are examined with the result recorded in the second line of FIG. 6. It can now be seen that the distinguishing characteristic recognized by association unit 32A is that out of any number of random samples of the letter A, 38/50 of these samples will cause the threshold of association unit 32A to be exceeded whereas out of any number of random samples of the letter B, only 14/50 of the samples will cause the threshold of association unit 32A to be exceeded. Stated in another way, the statistical probability that a pattern known to be an A will exceed the threshold of association unit 32A is 38/50 or 76% while the statistical probability that a pattern known to be a B will exceed the threshold of association unit 32A is only 14/50 or 28%. While equal number of samples of the two classes of patterns has been assumed, it is obvious that the number of samples need not be the same for each class as long as the numbers chosen for each class are large enough to be representative. However the use of the same number of samples has the advantage that the probability scores registered by the counters 68 may be employed directly in setting weighting circuits 74.

The learning process may be continued for additional classes in the manner described above. Since the system shown in FIG. 3 has four pairs of ratio devices 74 associated with each association unit 32 and four adder units 78, 92, 98 and 108, the system of FIGS. 1–5 is capable of recognizing four different classes of patterns, for example block letters A, B, C and D.

The data accumulated during the learning phase is employed as follows. The ratio unit 74A+ is set to the ratio of the count registered in counter 68A+ in response to the signals of the first class to the total number of signals of the first class. Ratio unit 74A− is set to the ratio of the count registered in counter 68A− in response to the signals of the first class to the total number of signals of the first class. In a similar manner the response of counter 68A+ to patterns of the second, third and fourth classes determines the settings of ratio units 88+, 94A+ and 102A+, respectively. The response of counter 68A− to patterns of the second, third and fourth classes determines the settings of ratio units 88A−, 94A− and 102A−, respectively. The same procedure is followed for setting the ratio units of circuits 80B and 80X, respectively. Since the association units 32A, 32B and 32X view the sample patterns simultaneously, the counter pairs 68A+, 68A−; 68B+, 68B−; and 68X+, 68X− will register data simultaneously. Thus only one showing of the sample patterns of each class is required. Since the response to all counters 68 to a pattern of the first class is employed to set a corresponding ratio circuit 74, it is obvious that the response of each of the counters 68 to patterns of the first class may be "recorded" by setting the corresponding ratio device to its proper value before the counter is cleared. This may be repeated for patterns of the second, third and fourth classes.

RECOGNITION PHASE

Once the ratio devices 74 have been set in accordance with the data accumulated during the learning phase, the system is ready to recognize unknown patterns. The switches 66 are moved to connect threshold unit 44 to the buffer amplifier circuit 70.

Suppose a pattern known to be a letter selected from the group A, B, C and D, i.e. the four pattern classes which can be recognized by the system shown in FIG. 3, is examined by the system. Suppose further that as a result of this examination the threshold of association unit 32A and 32X are exceeded but the threshold of association unit 32B is not exceeded. Adder circuit 78 together with its associated ratio devices computes the conditional probability of the occurrence of the observed total response on the hypothesis that the unknown pattern is an A. Since the threshold of association units 32A and 32X are exceeded, ratio devices 74A+ and 74X+ will receive an input signal but ratio devices 74A− and 74X− will not. Conversely, the ratio device 74B− will be provided with an input signal but ratio device 74B+ will not. Thus the output signal of adder circuit 78 is equal to $$\log \frac{38}{50}+\log \frac{53}{50}+\log \frac{32}{50}$$

The output signal from adder circuit 78 will thus be proportional to the log of $$\frac{52288}{125000}$$

or approximately equal to the log of .42. Adder circuit 78 may include an anti-logarithm circuit for converting the logarithmic signals to ratio signals. Alternatively, the output signals may be provided in logarithmic form. In either event, the output signal from adder circuit 78 indicates the conditional probability of the occurrence of the observed total response on the hypothesis that the unknown pattern is an A is approximately .42.

In a similar manner, adder circuits 92, 98, and 108 and the associated ratio circuits will compute the conditional probabilities for the unknown pattern is a B, C or D, respectively. Using the values shown in FIG. 6, it will be seen that the conditional probability for a B is $$\left(\frac{14}{50}\right)\left(\frac{31}{50}\right)\left(\frac{15}{50}\right)=.052$$

for a C is $$\left(\frac{7}{50}\right)\left(\frac{9}{50}\right)\left(\frac{20}{50}\right)=.01$$

and for a D is $$\left(\frac{25}{50}\right)\left(\frac{18}{50}\right)\left(\frac{44}{50}\right)=.16$$

Thus the conditional probability of the occurrence for the hypothesis that the character is an A is at least 2.5 times as great as it is for any other letter. Therefore the unknown pattern is recognized as an A. It should be remembered that the above example assumes only three association units. Increasing the number of association units will increase the spread between the probabilities of the several classes. In systems having large numbers of association units the probability that the pattern is of one class will ideally be of the order of 100 or more times the probability that it is of a different class. Thus it can be said with substantial certainty that the pattern or non-pattern is recognized as belonging to a particular class. If the relative distribution of elements among the various classes is known, weighting circuits 79, 93, 99 and 109 may be set to reflect this distribution. In the example given above, weighting circuit 79 is set to reflect the relative frequency of occurrence of the letter A in the text being examined.

The underlying probability principle on which the system of FIGS. 1 through 5 operates may be more precisely stated for recognition among many classes. Let the various concept classes be $C_1, C_2 \ldots, C_i \ldots$; and let the $n$ associative units be $A_1, A_2 \ldots, A_n$. The unknown X is chosen from some full set of elements which constitute the various C-classes, and X creates a response event $E(X)$ consisting of a specific sequence of $n$"+ or —" indications from the A-units. (This response event E is sometimes called the "character of X" or the "property listing.") Denote by $P(C_i)$ the initial probability of choosing at random a particular example X in the $C_i$— class from the total set of all possible X's. By Bayes' rule for conditional probabilities, the conjunctive probability $P(C_i, E)$ that X belongs to $C_i$ and that the event E occurs is $$P(C_i, E)=P(C_i)\cdot P(E|C_i)=P(E)\cdot P(C_i|E)$$

where $P(E|C_i)$ is the probability that E cocurs if X is in $C_i$, and $P(C_i|E)$ is the probability of $C_i$ if E occurs. The quantity of fundamental interest to the machine is $$P(C_i|E)=\frac{P(C_i)\cdot P(E|C_i)}{P(E)}$$

The conditional probability $P(E|C_i)$ is calculated and known by the machine for each $i$ subscript. $P(E)$ is unknown, but a constant for all $i$. Therefore, the numerator of the above expression is evaluated for each $i$, and the machine chooses as its decision the particular $i$th class for which $P(C_i|E)$ is maximum.

If no supplementary information is available concerning the relative distribution of the elements among the C-classes, then one may assume that all the $P(C_i)$ quantities are equal. If the additional information is available, however, then the numerical value for each $P(C_i)$ should be used in the maximizing calculations to strengthen the reliability of the result. For example, if the machine is used to identify the letters A through Z occurring in English words, the relative frequencies of occurrence for each letter are known, and can be used.

FIGURE 7

Figure 7:
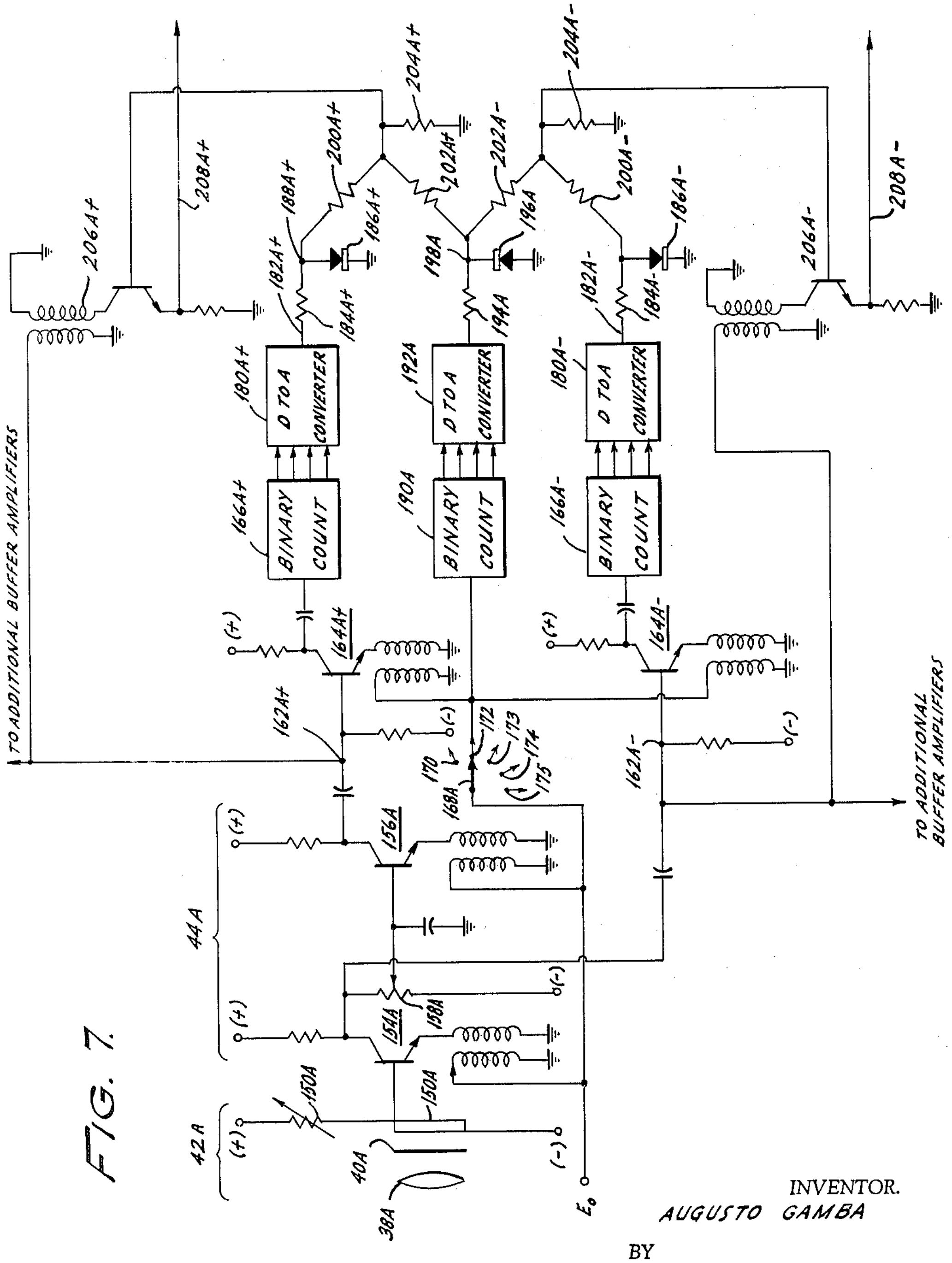
FIG. 7 is a schematic wiring diagram of a second preferred embodiment of a representative portion of the block diagrams of FIGS. 2 and 3.

In the embodiment of the invention shown in FIGS. 1–5 it is necessary to transfer the count obtained during the learning phase to the ratio circuits 74. FIG. 7 illustrates a circuit in which the count obtained during the learning phase automatically controls the ratio circuits. The lens 38A and mask 40A in FIG. 7 corresponds to similarly numbered elements in FIGS. 1–3. The photoresponsive unit 42A of FIG. 7 comprises a photodiode 150A with an adjustable resistor 152A in series therewith. The threshold unit 44A comprises two transistor amplifier stages 154A and 156A in cascade. Stage 156A is coupled to stage 154A by way of an adjustable potentiometer 158A which provides a further control of the threshold level of the circuit. A clock-pulse source represented by the symbol $E_0$ in FIG. 7 is transformer coupled into the emitter circuits of transistor stages 154A and 156A. One clock pulse is generated for each pattern under observation. As a result an output signal will appear on lead 162A+ if the particular pattern under observation causes the threshold of circuit 44A of FIG. 7 to be exceeded. A pulse will appear on lead 162A— if the threshold is not exceeded.

The signal on output lead 162A+ is coupled through a gated buffer amplifier 164A+ to the input of a binary counter 166A+. The emitter circuit of gated buffer amplifier 164A+ is supplied with clock pulses by way of a switch 168A. Switch 168A has an off position 170, a position 172 which connects to the inputs of gated buffer amplifiers 164A+ and 164A— and additional positions 173, 174 and 175 which connect to other pairs of gated buffer amplifier circuits 164.

Binary counter 166A+ has a capacity equal to or greater than the number of patterns which may exceed the threshold during the learning phase. A seven stage binary counter will provide a count of 128. Binary counter 166A+ is coupled to a digital-to-analog converter 180A+ which converts the digital count provided by counter 166A+ to an analog voltage at output 182A+. In general each active stage of binary counter 166A+ will be coupled to digital-to-analog converter 180A+. For this reason multiple connections have been shown between blocks 166A+ and 180A+. Resistor 184A+ and diode 186A+ provided a logarithmic response circuit. The signal appearing at point 188A+ will be equal to the logarithm of the count supplied by binary counter 166A+. A second binary counter 190A has its input coupled to point 172 of switch 168A. A digital-to-analog converter 192A which may be similar to converter 180A+ is coupled to the output of binary counter 190A. A logarithmic response circuit 194A–196A is coupled to the output of converter 192A. The polarity of the diode 196A in this circuit is opposite to that of the diode 186A+. Therefore the signal at point 198A is proportional to minus the logarithm of the total number of patterns observed as indicated by the clock pulses $E_0$ supplied to binary counter 190A. Resistors 200A+, 202A+ and 204A+ form a resistive adder network which combines the logarithmically related signals appearing at points 188A+ and 198A. It will be seen that the signal appearing across resistor 204A+ is a signal proportional to the logarithm of the ratio of the count appearing in binary counter 166A+ to the count appearing in binary counter 190A. Again it should be pointed out that if the same number of samples are taken for each class, binary counter 190A, converter 192A, and circuit elements 194A, 196A, 202A+ 200A+ and 204A+ may be omitted and the signal appearing at output 182A+ employed in place of the signal appearing across resistor 204A+.

The signal appearing across resistor 204A+ is supplied to the base for transistor pulse amplifier stage 206A+. The pulses which occur at output lead 162A+ if the threshold of circuit 44A is exceeded are transformer coupled to the collector circuit of stage 206A+. Thus if an output signal appears at output lead 162A+ indicating that a pattern has been examined and that the pattern is such that the threshold of circuit 44A is exceeded, then a signal will appear on output connection 208A+ which is proportional to the product of the constant amplitude pulse present on lead 162A and the logarithmic ratio signal appearing across resistor 204A+. Output lead 208A may be connected to a signal adder circuit corresponding generally to signal adder circuit 78 of FIG. 2.

The circuits just described which are supplied by output lead 162A+ are duplicated for output lead 162A—. These circuits have been identified with the same reference numerals as blocks in the upper channel but with a minus sign substituted for the plus sign in accordance with the convention adopted herein.

The entire circuit following output leads 162A+ and 162A— in FIG. 7 is duplicated for each character to be recognized. This is indicated in FIG. 7 by the legends "To Additional Buffer Amplifiers." The entire system shown in FIG. 7 is, of course, duplicated for each association unit.

The embodiment of the invention illustrated in FIG. 7 operates as follows. With the binary counters 166A+, 166A− and 190A set to zero, switch 168A is set to position 172 and a representative number of patterns of the first class are examined. When all patterns of the first class have been examined, switch 168A is moved from contact 172 to contact 173. This fixes the count in binary counters 166A+, 166A− and 190A. Samples of the second class of patterns may now be examined and the results recorded in circuits which duplicate the right-hand portion of FIG. 7. Switch 168A is stepped in this manner as each new class of patterns is examined. When all classes have been examined, switch 168A is stepped to the off position 170. This terminates the learning phase and fixes all of the counts in binary counters 166 and 190. It is believed that the operation of the circuit from this point on will be obvious from the foregoing detailed description of FIG. 7.

FIGURE 8

The embodiments of the invention described to date have employed a plurality of photoresponsive units 42 each with its corresponding mask 40 to form a plurality of association units 32A. In the embodiment shown in FIG. 8, a single photoresponsive unit 220 may be provided in conjunction with a plurality of masks 222A, 222C, 222D, and 222E. Masks 222 are mounted on a rotating wheel 224 so that they pass in sequence in front of pattern 226. A lens 228 focuses the superimposed pattern 226 and the superposed mask 222 on the photosensitive area of unit 220. Wheel 224 has been shown positioned adjacent the pattern 226 to be examined. Alternatively wheel 224 may be positioned adjacent photoresponsive unit 220 so that the masks are adjacent the photosensitive area of unit 220 rather than adjacent the pattern 226. As still another alternative, pattern 226, wheel 224 and photoresponsive unit 220 may be positioned closely adjacent one another so that lens 228 may be dispensed with.

Wheel 224 may be provided with suitable synchronizing means 230 around the periphery thereof. These synchronizing means may be contacts or magnetic members which will cause synchronizing circuit 232 to generate a synchronizing pulse each time one of the synchronizing members 230 passes probe 234. Synchronizing circuit 232 provides synchronizing pulses to generator 236 which energizes light source 238. Thus light source 238 is pulsed each time a different mask is interposed between object 226 and unit 220. The threshold unit 240 of FIG. 8 may correspond to the threshold units shown in FIGS. 5 or 7, for example. The signals appearing on output leads 242+ and 242− of threshold unit 240 will be similar to the information appearing at the output of threshold unit 44 of FIGS. 5 or 7, for example, except that the signals corresponding to the various masks 222 will occur in time sequential form. The time sequential information appearing on leads 242+ and 242− may be converted to simultaneously occurring information signals by passing the signal on lead 242+ through a tapped delay line 250+ which has a delay between output taps equal to the time between successive light impulses supplied by source 238. A similar tapped delay circuit 250− is coupled to output lead 242−. A gate circuit 252 is provided with a single gating pulse from source 232 for each revolution of the wheel 224. Gate circuit 252 connects the taps on delay circuits 250+ and 250− to a data processing circuit 254. It will be seen that the signals at the output of gate circuit 252 will be pulse-type signals which correspond to the pulse-type signals at the output of threshold units 44 of an embodiment constructed in accordance with FIG. 7. Therefore the data processing circuit 254 shown in block form in FIG. 8 may be identical to the processing circuits shown in the right-hand half of the circuit of FIG. 7.

Figure 8:
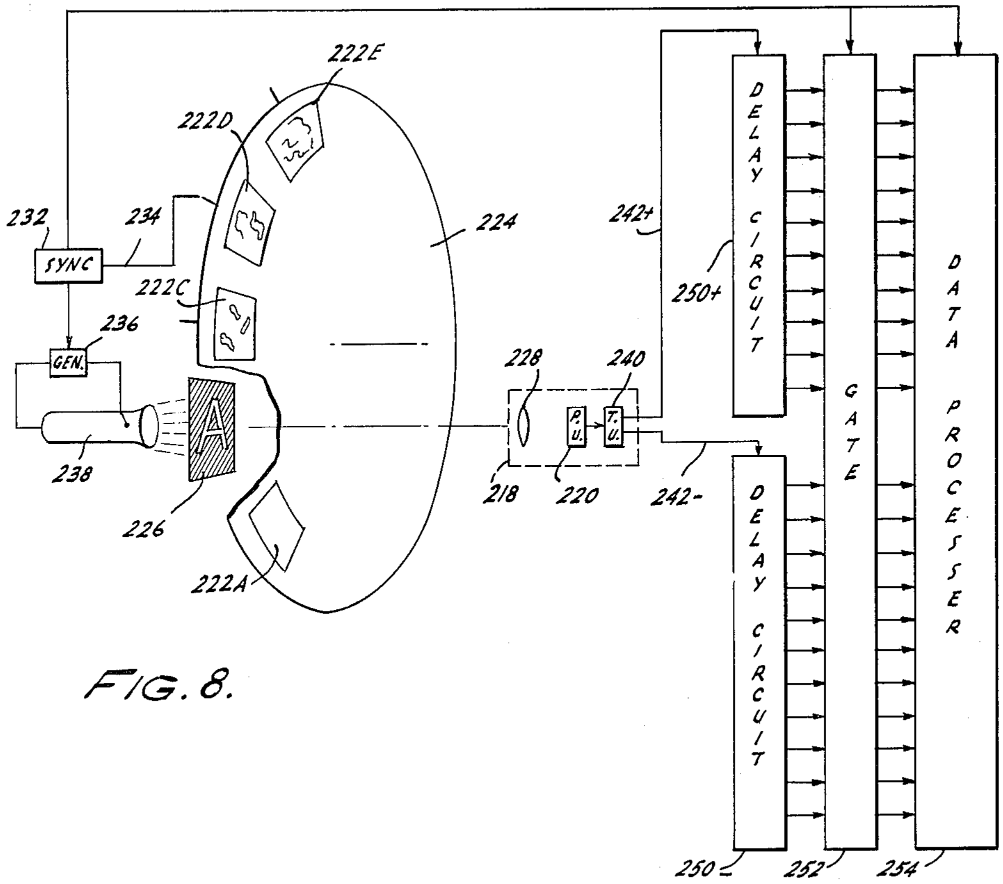
FIG. 8 is a pictorial view, partially in block form of an embodiment of the invention which requires only a single photoresponsive unit.

During the learning phase of the embodiment shown in FIG. 8, it is desirable that wheel 224 make only one revolution for each sample pattern 226. As an alternative, synchronizing circuit 232 may be such that strobe 238 is energized for only one complete revolution of wheel 224 although pattern 226 may remain in position for more than one revolution of the wheel 224.

As a further modification of the system shown in FIG. 8, the mask 222 may comprise separate frames of a continuous film belt. Suitable means may be provided for causing the frames on the film belt to pass in succession before pattern 226.

It is to be understood that all of the data processing circuits shown in the drawing may be replaced by a suitable computer which can be programmed to tabulate the responses obtained during the learning phase and to perform the necessary calculation during the recognition phase. The necessary steps may be programmed on any large scale digital or analog computer, for example the Philco 2000 computer.

FIGURES 9A AND 9B

Figure 9B:
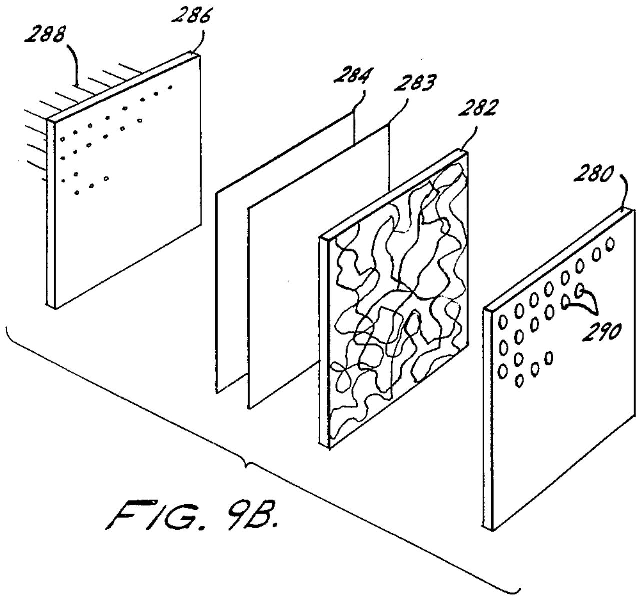
FIGS. 9 and 9A are views showing a preferred unitary assembly of a plurality of association units.
Figure 9A:
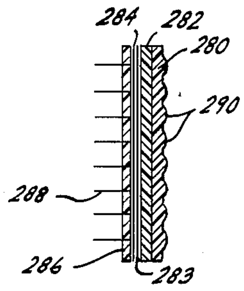

In the embodiment of the invention illustrated in FIGS. 1–5 the association units 32 are formed of individual lenses, individual photocells and individual masks. FIG. 9A is a cross-sectional view of a different embodiment of the invention in which a plurality of association units are included in a small, simple, inexpensive and readily formed assembly. FIG. 9B is an exploded view of the assembly shown in cross-section in FIG. 9A. In the embodiment shown in FIGS. 9A and 9B the individual lenses have been replaced by a composite lens sheet 280. The individual masks are replaced by a single composite mask 282. The individual photocells are replaced by a photoconductive layer 284 and an insulating plate 286 having connecting wires 288 passing therethrough.

The composite lens sheet 280 is formed with a plurality of individual lenticular areas 290 which are preferably arranged in a regular pattern on plate 280. If plate 280 is constructed of a thermoplastic material the individual lenticular areas 290 may be formed by hot pressing one or both sides of the plate 280 with a suitably formed die. Since it is not necessary that the image focused by the individual lenticular areas 290 match a template or particular set of lines or areas, minor irregularities in the individual areas 290 will not degrade the performance of the system.

The random mask 282 comprises a plurality of random or pseudo random lines or areas on a transparent plate. Preferably the widths of individual lines is small compared to the diameter of the lenticular areas 290. Since the lines are distributed in a random or pseudo random manner on the entire plate 282, the area of the mask 282 overlying each of the lenticular areas 290 on plate 280 will be in the form of a random or pseudo random mask. Mask 282 has been shown as formed on a separate sheet of transparent material. However if the rear surface of sheet 280 is flat, the mask may be formed by drawing or printing opaque lines or areas on the rear surface of plate 280.

The equivalent of a plurality of individual photocells is achieved by forming a transparent conductive layer on one side of mask 282. Tin oxide forms a suitable transparent conductive film. Photoconductive film 284 may be deposited directly on the conductive film 283. Film 284 is preferably relatively thin so as to have a relatively high resistance in a direction parallel to the sheet 282. The condctors 288 associated with sheet 286 extend through sheet 286 and into contact with photoconductive film 284. Each of the conductors 288 is positioned in registry with one of the lenticular areas 290 on plate 280. The conductive film 283 provides one common terminal for all of the individual photosensitive areas. Each conductor 288 forms the second terminal to an individual photosensitive area. The high resistance of film 284 in a direction parallel to plate 282 effectively isolates each photosensitive area on the adjacent photosensitive area. Therefore it is not necessary to subdivide the film 284 into individual areas.

Each of the conductors 288 may be connected to a suitable threshold circuit, for example a threshold circuit of the type shown in FIGS. 5 or 7. The entire assembly shown in FIG. 9A may be suitably bonded together to form a single unitary structure. Such a structure is more compact and much less expensive to construct in the individual association units of FIGS. 1–3.

It is to be understood that the embodiments described above are not restricted in their operations to patterns visible to the human eye. For example the patterns may be illuminated with infrared radiation as well as visible light. Further certain patterns may be self luminous. The radiation of infrared radiation from the surface of a nonuniformly heated plate and the pattern present on the screen of a cathode ray tube are well known examples of self luminous patterns.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

What is claimed is:

1. A pattern recognition system comprising a plurality of association units, each of said association units comprising a single energy responsive device and a mask adapted to control the response of said energy responsive device to patterns to be viewed, different ones of said association units providing different responses to patterns to be viewed, means for weighting the response of each association unit in accordance with a statistically determined relationship between the mask of that association unit and selected classes of patterns to be recognized, and means coupled to said response weighting means for providing an output signal which is respresentative of the product of the weighted responses of a selected number of said association units.

2. A pattern recognition system in accordance with claim 1 wherein said masks are formed of randomly or pseudo randomly distributed energy transmissive and energy blocking areas.

3. A pattern recognition system in accordance with claim 1 wherein each of said association units is separate from each other association unit.

4. A pattern recognition system in accordance with claim 1 wherein a single energy responsive device is common to all of said association units and wherein a different mask is provided for each association unit, said masks being formed with differently distributed energy transmissive and energy blocking areas.

5. A pattern recognition system comprising a plurality of association units, each of said association units comprising a single photoresponsive device and a mask, each of said masks being so positioned with respect to the patterns to be recognized and said photoresponsive device associated therewith that the presence of said mask modifies the total energy received by said photoresponsive device from said pattern in accordance with the characteristics of that mask, each of said association units further comprising a threshold unit coupled to said photoresponsive device, said threshold unit being adapted to provide one output signal in response to the incidence of more than a preselected amount of energy on said photoresponsive device and a different output signal in response to the incidence of less than said selected amount of energy on said photoresponsive device, signal ratio means coupled to each of said threshold units for weighting said two output signals of said threshold unit in accordance with a statistically determined relationship between the mask of that association unit and a selected class of patterns to be recognized and means coupled to said signal ratio means for providing an output signal which is representative of the product of the weighted output signals of a selected group of said threshold units.

6. A pattern recognition system in accordance with claim 5 wherein said masks are formed of randomly or pseudo randomly distributed radiant energy transmissive and radiant energy opaque areas.

7. A pattern recognition system in accordance with claim 5 wherein each of said association units is separate from each other association unit.

8. A pattern recognition system in accordance with claim 5 wherein a single photoresponsive device is common to all of said association units and wherein a different mask is provided for each association unit, said masks being formed with differently distributed radiant energy transmissive and radiant energy opaque areas.

9. A pattern recognition system comprising means for illuminating patterns to be recognized, a plurality of association units, each of said association units comprising a single photoresponsive device and a mask, each of said masks being positioned in that path of the illuminating energy from said source to the corresponding photoresponsive device which includes said pattern to be recognized whereby the total illuminating energy received by each said photoresponsive device from said pattern is modified in accordance with the characteristics of the corresponding mask, each of said association units further comprising a threshold unit coupled to said photoresponsive device, said threshold unit being adapted to provide one output signal in response to the incidence of more than a preselected amount of energy on said photoresponsive device and a different output signal in response to the incidence of less than said selected amount of energy on said photoresponsive device, signal ratio means coupled to each of said threshold units for weighting said two output signals of said threshold unit in accordance with a statistically determined relationship between the mask of that association unit and selected classes of patterns to be recognized and means coupled to said signal ratio means for providing an output signal which is representative of the product of the weighted responses of a selected number of said association units.

10. A pattern recognition system in accordance with claim 9 wherein said masks are formed of randomly or pseudo randomly distributed radiant energy transmissive and radiant energy opaque areas.

11. A pattern recognition system in accordance with claim 9 wherein each of said association units are separate from each other association unit.

12. A pattern recognition system in accordance with claim 9 wherein a single energy responsive device is common to all of said association units and wherein a different mask is provided for each association unit, said masks being formed with differently distributed radiant energy transmissive and radiant energy opaque areas.

13. A pattern recognition system comprising means for illuminating patterns to be recognized, a plurality of association units, each of said association units comprising a single photoresponsive device and a mask, each of said masks being positioned in that path of the illuminating energy from said source to the corresponding photoresponsive device which includes said pattern to be recognized whereby the total illuminating energy received by each said photoresponsive device from said pattern is modified in accordance with the characteristics of the corresponding mask, each of said association units further comprising a threshold unit coupled to said photoresponsive device, said threshold unit being adapted to provide one output signal in response to the incidence of more than a preselected amount of energy on said photoresponsive device and a different output signal in response to the incidence of less than said selected amount of energy on said photoresponsive device, a plurality of signal ratio means coupled to the output of each threshold unit, each of said signal ratio means weighting the response of the associated threshold unit in accordance with a statistically determined relationship between the mask of the same association unit as said threshold unit, and a single class of patterns to be recognized, a plurality of signal combining means, each of said signal combining means being coupled to the ones of said signal ratio means which are related to the same class of patterns, and means associated with said signal combining means for indicating the relative magnitudes of the output signals of said plurality of signal combining means.

14. A system in accordance with claim 13 wherein said two output signals of each said threshold unit are of fixed amplitude, wherein each of selected ones of said signal ratio device provides an output signal proportional to the logarithm of the statistically determined probability score that a pattern of a given class will cause the incidence of more than selected amount of energy on the corresponding said photoresponsive device, and wherein each of said signal combining means comprises a linear signal adder means.

15. For use in a pattern recognition system, a unitary assembly of a plurality of association units, said assembly comprising a first plate formed with a plurality of radiant energy transparent lenticular areas disposed in a preselected array on said plate, a continuous mask overlying said first plate, said mask being formed of distributed radiant energy transmissive and radiant energy opaque areas, said last-mentioned areas being small compared to individual ones of said lenticular areas, a photoresponsive film overlying said mask, a plurality of individual conductors, each of said conductors making contact with said photoresponsive film at a different point, said different points being substantially in registry with said lenticular areas of said first plate, and means for making electrical contact with said film at a second plurality of points corresponding to and spaced from said different points.

16. For use in a pattern recognition system, a unitary assembly of a plurality of association units, said assembly comprising a first plate, a mask, a transparent conductive film and a photoresponsive film arranged in a stacked relationship, said conductive film being disposed in electrical contact with one surface of said photoresponsive film, said first plate being formed with a plurality of radiant energy transparent lenticular areas arranged in a preselected array on said first plate, said mask being formed of distributed radiant energy transmissive and radiant energy opaque areas, said last-mentioned areas being small compared to individual ones of said lenticular areas, said assembly further comprising a plurality of individual conductors, each of said conductors making contact with a second surface of said photoresponsive film at a point substantially in registry with an individual one of said lenticular areas.

References Cited by the Examiner

UNITED STATES PATENTS

| | | | |
|---|---|---|---|
| 2,495,697 | 1/1950 | Chilowsky | 250—213 X |
| 2,663,758 | 12/1953 | Shepard | 340—146.3 |
| 2,924,812 | 2/1960 | Merritt et al. | 340—149 |
| 2,933,246 | 4/1960 | Rabinow | 340—146.3 |
| 2,978,675 | 4/1961 | Highleyman | 340—146.3 |
| 3,016,518 | 1/1962 | Taylor | 340—149 |
| 3,025,495 | 3/1962 | Endres | 340—149 |
| 3,064,519 | 11/1962 | Shelton | 340—146.3 |
| 3,085,227 | 4/1963 | Brown | 340—146.3 |
| 3,165,634 | 1/1965 | Raymond | 250—219 |

MALCOLM A. MORRISON, *Primary Examiner*.

WALTER STOLWEIN, *Examiner*.

J. S. IANDIORIO, J. E. SMITH, *Assistant Examiners*.